No. 691,801. Patented Jan. 28, 1902.
W. S. PALMER.
KETTLE OR DISH SCRAPER OR CLEANER.
(Application filed May 25, 1901.)
(No Model.)
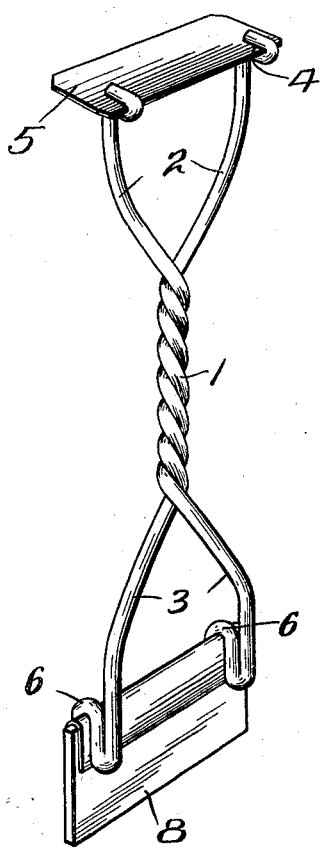
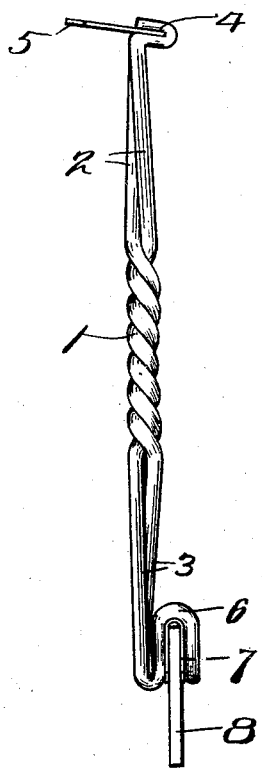
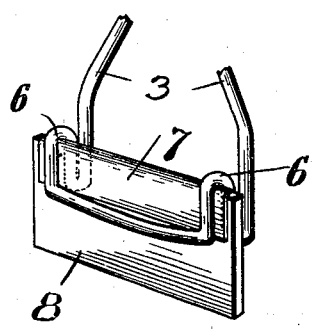
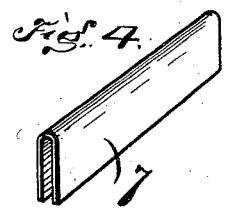

UNITED STATES PATENT OFFICE.

WESLEY S. PALMER, OF CANTON, OHIO.

KETTLE OR DISH SCRAPER OR CLEANER.

SPECIFICATION forming part of Letters Patent No. 691,801, dated January 28, 1902.

Application filed May 25, 1901. Serial No. 61,833. (No model.)

*To all whom it may concern:*

Be it known that I, WESLEY S. PALMER, a citizen of the United States, residing at Canton, in the county of Stark and State of Ohio, have invented certain new and useful Improvements in Kettle or Dish Scrapers or Cleaners; and I do hereby declare that the following is a full, clear, and exact description of the same, reference being had to the annexed drawings, making a part of this specification, and to the figures of reference marked thereon, in which—

Figure 1 is a perspective view. Fig. 2 is an edge view. Fig. 3 is a view showing the elastic head or block properly connected to the handle, also showing a portion of the handle. Fig. 4 is a detached view of the elastic head-binding strip.

The present invention has relation to kettle scrapers and cleaners; and it consists in the novel arrangement hereinafter described, and particularly pointed out in the claim.

Similar numerals of reference indicate corresponding parts in all the figures of the drawings.

In the accompanying drawings, 1 represents the handle, which is formed of two wires or parts twisted together and the parts extended in either direction to form the diverging arms 2 and 3. The outer ends of the diverging arms 2 are bent at an angle to the arms 3 and folded so as to form recesses 4, into which recesses the scraping-plate 5 is seated and securely fixed in any convenient and well-known manner. The arms 3 are provided with the bent portions 6, which bent portions are so formed that they will form an open space, into which space the binding-strip 7 is seated and securely connected to the bent portions 6 of the arms 3. The binding-strip 7 is U-shaped in cross-section and is so formed for the purpose of providing a means for clamping the elastic block 8, which elastic block is substantially of the form shown and is preferably formed of rubber.

It will be understood that by my peculiar arrangement I am enabled to provide at one end of the handle a scraper and at the opposite end thereof a cleaning device.

It will of course be understood that the scraper 5 should be formed of metal and have a blunt edge, so as to provide a suitable scraper to remove material adhering to the kettle or other utensil.

The binding-strip 7 is securely connected to the bent portions 6 in any convenient and well-known manner.

Having fully described my invention, what I claim as new, and desire to secure by Letters Patent, is—

As an improved article of manufacture, a kettle scraper and cleaner consisting of the twisted handle 1 having diverging arms at the opposite ends of the handle, the outer ends of the diverging arms 2 provided with folded portions and a scraper connected to said folded portions, the arms 3 provided with bent portions said bent portions spaced from each other and a binding-strip connected to said bent portions, and an elastic block fitted in the binding-strip, substantially as and for the purpose specified.

In testimony that I claim the above I have hereunto subscribed my name in the presence of two witnesses.

WESLEY S. PALMER.

Witnesses:
BENEDICT I. FOUGAN,
CHAS. AHRHART, Jr.